United States Patent
Yamazaki et al.

(10) Patent No.: US 6,900,855 B1
(45) Date of Patent: *May 31, 2005

(54) DISPLAY DEVICE HAVING RESIN BLACK MATRIX OVER COUNTER SUBSTRATE

(75) Inventors: Shunpei Yamazaki, Tokyo (JP); Takeshi Nishi, Kanagawa (JP)

(73) Assignee: Semiconductor Energy Laboratory Co., Ltd., Atsugi (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/443,678

(22) Filed: Nov. 18, 1999

Related U.S. Application Data

(63) Continuation of application No. 08/728,406, filed on Oct. 9, 1996, now Pat. No. 6,175,395.

(30) Foreign Application Priority Data

Oct. 12, 1995 (JP) ............................................. 7-290373

(51) Int. Cl.[7] ........................ G02F 1/136; G02F 1/1335; G02F 1/1333
(52) U.S. Cl. ........................ 349/44; 349/106; 349/110; 257/59
(58) Field of Search ................................ 349/110, 106, 349/137, 159, 42; 252/584; 257/59; 359/254; 396/484; 428/1

(56) References Cited

U.S. PATENT DOCUMENTS

| | | | | |
|---|---|---|---|---|
| 4,408,836 A | * | 10/1983 | Kikuno | 349/152 |
| 4,636,038 A | | 1/1987 | Kitahara et al. | 349/138 |
| 4,682,075 A | * | 7/1987 | Nelson et al. | 313/466 |
| 4,832,457 A | * | 5/1989 | Saitoh et al. | 349/73 |
| 4,846,556 A | * | 7/1989 | Haneda | 349/106 |
| 4,874,227 A | * | 10/1989 | Matsukawa et al. | 349/73 |
| 4,906,071 A | * | 3/1990 | Takahara et al. | 349/73 |
| 4,934,791 A | * | 6/1990 | Shimizu et al. | 349/106 |
| 5,032,531 A | | 7/1991 | Tsutsui et al. | 437/40 |
| 5,055,899 A | * | 10/1991 | Wakai et al. | 349/43 |
| 5,106,197 A | * | 4/1992 | Ohuchida et al. | 349/73 |
| 5,121,237 A | * | 6/1992 | Ikeda et al. | 349/110 |
| 5,124,823 A | | 6/1992 | Kawasaki et al. | |
| 5,148,301 A | * | 9/1992 | Sawatsubashi et al. | 349/151 |
| 5,164,853 A | * | 11/1992 | Shimazaki | 349/58 |
| 5,200,846 A | | 4/1993 | Hiroki et al. | 349/174 |
| 5,200,847 A | * | 4/1993 | Mawatari et al. | 349/42 |
| 5,250,931 A | * | 10/1993 | Misawa et al. | 349/42 |
| 5,260,815 A | * | 11/1993 | Takizawa | 349/159 |
| 5,287,205 A | | 2/1994 | Yamazaki et al. | 349/174 |
| 5,323,205 A | * | 6/1994 | Matsubara et al. | 369/488 |
| 5,345,324 A | * | 9/1994 | Koseki et al. | 349/44 |
| 5,418,094 A | * | 5/1995 | Sato et al. | 349/110 |
| 5,453,858 A | * | 9/1995 | Yamazaki | 349/151 |
| 5,501,900 A | | 3/1996 | Harada et al. | |
| 5,512,215 A | * | 4/1996 | Tachizono et al. | 252/584 |
| 5,568,288 A | | 10/1996 | Yamazaki et al. | 349/42 |
| 5,608,557 A | * | 3/1997 | Wu | 349/42 |
| 5,615,030 A | | 3/1997 | Harada et al. | |
| 5,644,370 A | * | 7/1997 | Miyawaki et al. | 349/43 |
| 5,650,664 A | * | 7/1997 | Sakamoto | 349/39 |
| 5,677,380 A | | 10/1997 | Matsumura et al. | |

(Continued)

FOREIGN PATENT DOCUMENTS

| | | |
|---|---|---|
| EP | 0 614 108 A1 | 9/1994 |
| JP | 06-3659 | 1/1994 |
| JP | 07-181461 | 7/1995 |
| KR | 93-3266 | 2/1993 |
| KR | 1994/0022155 | 10/1994 |
| KR | 96-29817 | 8/1996 |

*Primary Examiner*—Huyen Ngo
(74) *Attorney, Agent, or Firm*—Fish & Richardson P.C.

(57) ABSTRACT

A display device is disclosed. The display device has a first substrate having a thin film transistor connected to a pixel electrode. Further, the display device has a second substrate opposed to the first substrate and having a resin black matrix.

20 Claims, 12 Drawing Sheets

U.S. PATENT DOCUMENTS

| | | | |
|---|---|---|---|
| 5,710,606 A | * 1/1998 | Nakajima et al. | 349/151 |
| 5,739,880 A | 4/1998 | Suzuki et al. | 349/110 |
| 5,777,701 A | 7/1998 | Zhang | |
| 5,784,189 A | * 7/1998 | Bozler et al. | 359/254 |
| 5,786,042 A | * 7/1998 | Inoue et al. | 428/1 |
| 5,789,762 A | 8/1998 | Koyama et al. | |
| 5,790,220 A | 8/1998 | Sakamoto et al. | |
| 5,797,055 A | * 8/1998 | Matsubara et al. | 396/484 |
| 5,814,529 A | 9/1998 | Zhang | |
| 5,815,226 A | 9/1998 | Yamazaki et al. | 349/111 |
| 5,880,799 A | * 3/1999 | Inoue et al. | 349/110 |
| 5,886,365 A | * 3/1999 | Kouchi et al. | 257/59 |
| 5,933,205 A | 8/1999 | Yamazaki et al. | 349/43 |
| 5,963,278 A | 10/1999 | Yamazaki et al. | 349/43 |
| 6,175,395 B1 | * 1/2001 | Yamazaki et al. | 349/44 |

* cited by examiner

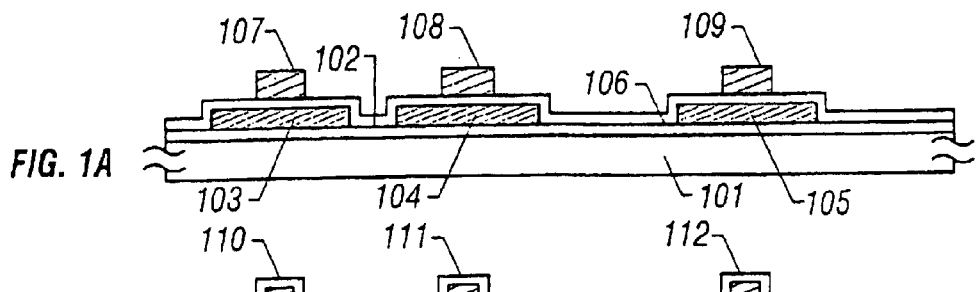
FIG. 1A
FIG. 1B
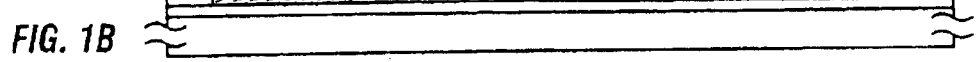
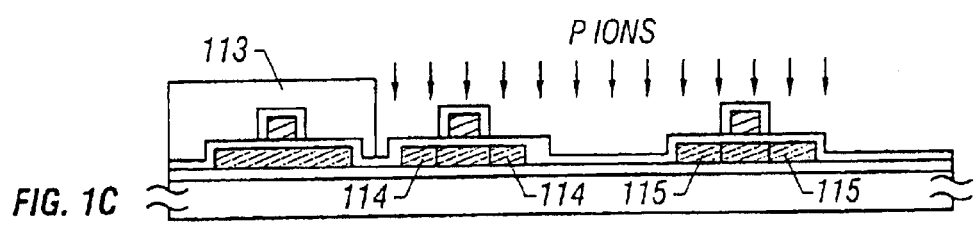
FIG. 1C
FIG. 1D
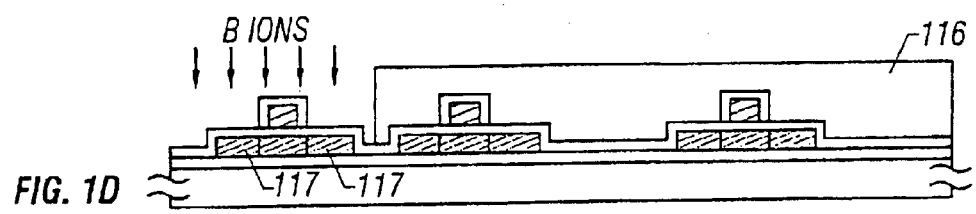
FIG. 1E
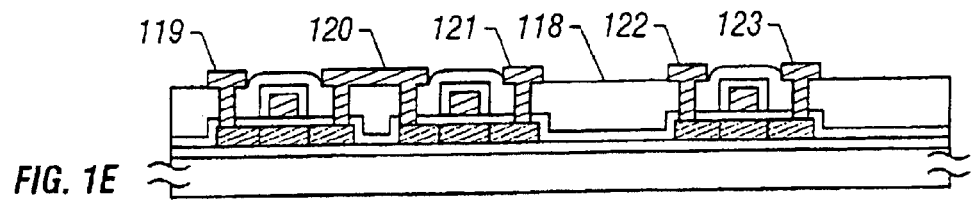
FIG. 1F
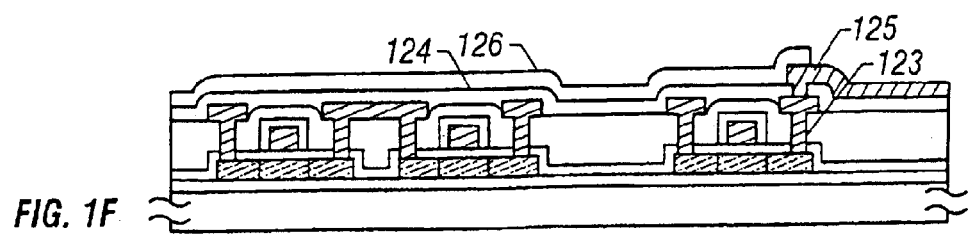
FIG. 1G
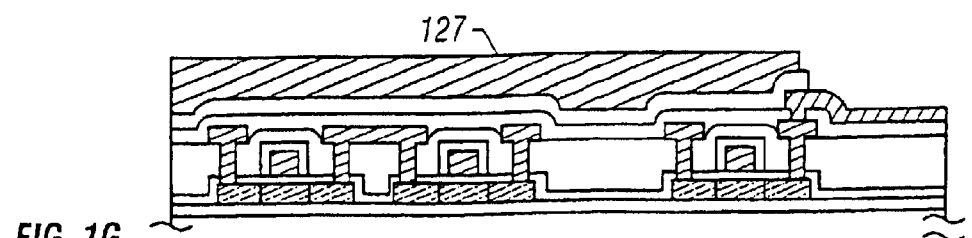

Overlap of ITO and
Black Matrix 7μm

Overlap of ITO and
Black Matrix 2μm

DISPLAY DEVICE HAVING RESIN BLACK MATRIX OVER COUNTER SUBSTRATE

This is a continuation of U.S. application Ser. No. 08/728,406, filed Oct. 9, 1996, now U.S. Pat. No. 6,175,395.

BACKGROUND OF THE INVENTION

1. Field of the Invention

The present invention relates to an active matrix liquid crystal display device.

2. Description of Related Art

Active matrix liquid crystal display devices are known as being effective for high-quality display. They are constructed such that thin-film transistors are formed on a transparent substrate (usually a glass or quartz substrate) for respective pixels. Each thin-film transistor controls charge that enters or exits from an electrode (pixel electrode) of the associated pixel. The active matrix liquid crystal display devices require circuits (peripheral circuits) for driving the thin-film transistors for the respective pixels. In general, the peripheral circuits are constructed as an external IC circuit called a driver IC.

In an advanced version, the peripheral circuits formed by using thin-film transistors are integrated on the substrate. Providing a unified structure in which the pixel region and the peripheral circuit regions are integrated on the same substrate, this configuration facilitates the use of a liquid crystal panel.

As an example of application of the above liquid crystal panel, a projection-type liquid crystal display apparatus will be described below.

A first method of performing color display is to form color filters of R (red), G (green), and B (blue) in a liquid crystal panel. A second method is to prepare a plurality of panels and combine images formed by those panels. In recent years, with an increasing need for large screen display, the second method is used more frequently to implement a projection-type display apparatus, because in the first method the substrate size needs to be increased and hence it is difficult to manufacture a panel. The second method is disclosed in Japanese Utility Model Laid-Open No. 58-111580.

In the second method, to combine images, the consistency of optical axes is important. Conventionally, liquid crystal panels are arranged independently and the modulating of optical axes is performed by adjusting the position and orientation of each panel in a subtle manner. However, this is not preferable because it causes a cost increase and complicates the structure of the apparatus. There is known a further technique in which the same images are superimposed on each other to increase the screen size or the brightness. However, this technique has a problem of cost increase because it complicates the apparatus structure.

To solve the above problems, attempts have been made to integrate the three panels into a single panel. In this case, it is basically sufficient to generate a set of images corresponding to three colors of R, G and B. The brightness can be increased by generating two or more sets of images corresponding to R, G and B.

In this type of configuration, in forming peripheral driver circuit regions, it has been attempted to locate peripheral circuits that should be integrated at a high density at positions as close to the center of a substrate as possible, to increase a final production yield.

However, the above conventional liquid crystal display devices have two problems described below.

The first problem is as follows. A black matrix which is made of a reflective metal such as Cr and occupies a large area of a display screen is formed on the inside surface of a upper transparent glass substrate that is located on the display screen side. External light is reflected by the black matrix and comes out of the display screen. This lowers the contrast of a displayed image and hence makes it less visible, that is, lowers the display quality.

The second problem relates to a case where a black matrix is formed on an opposed substrate. In this case, as shown in FIG. 11A, a black matrix 1 is so formed as to overlap with ITO pixel electrodes 2 by 5–7 μm in consideration of the bonding accuracy of the TFT substrate and the opposed substrate. Thus, the size of opening portions is restricted. In this case, to increase the brightness of the display device, it is necessary to employ a brighter back light, resulting in an increase in power consumption.

FIG. 11A shows how the black matrix 1 on the opposed substrate and the ITO pixel electrodes 2 overlap with each other. Reference numerals 3–5 denote a signal line, a TFT, and a scanning line, respectively.

SUMMARY OF THE INVENTION

To solve the above two problems, an object of the present invention is to form a black matrix on TFTs of a driver circuit. This configuration has an advantage that the overlapping width can be reduced to about 2 μm because of improved bonding accuracy that is obtained by forming the black matrix and the ITO pixel electrodes on the same substrate.

This advantage will be described with reference to 11B. FIG. 11B shows how they overlap with each other in a case where the black matrix 1 is formed on the TFT substrate. While in the former case (FIG. 11A) the aperture ratio is about 15% (overlapping width: 7 μm), in the latter case (FIG. 11B) it is greatly increased to about 40% (overlapping width: 2 μm).

On the other hand, in the above-mentioned configuration in which the opposed substrate is made large enough to be opposed to the driver circuits and the driver circuits are provided in the liquid crystal region, the driver circuit regions and the pixel region come close to each other, which requires light shielding even in the driver circuit regions.

Where the black matrix for light shielding of the pixel region is formed on the substrate on which TFTs are formed and is also used for light shielding of the driver circuits to satisfy the above requirement, there has occurred a problem that the capacitance of an interlayer insulating film between TFTs of the driver circuits and the black matrix is not negligible though the shielding itself does not cause any problem.

If the interlayer insulating film is a 3,000-Å-thick silicon nitride film, it has a unit area capacitance of $2.50 \times 10^{-16}$ $F/\mu m^2$. For example, if a clock line or the like of a driver circuit has a wiring line of 100 ɨm in width and 50,000 μm in length, a capacitance formed by this wiring line of the driver circuit and the black matrix amounts to $1.25 \times 10^{-9}$ F. In this case, if it is assumed that the wiring line of the driver circuit has a sheet resistance of 0.2 $\Omega/\mu m^2$, its delay time amounts to $1.25 \times 10^{-7}$ sec, which will cause a problem when the wiring line is driven at several megahertz. The circuit characteristics are more important in the driver circuits than in the pixel TFTs. Therefore, it is necessary to reduce the capacitance of the interlayer insulating film formed between TFTs of the driver circuits and the black matrix.

It is practiced to form only a black matrix 16 for a pixel region 14 on a TFT substrate 11 so as to be adjacent to ITO electrodes 17 and form a black matrix 18 for driver circuit regions 13 on an opposed substrate 12, as shown in FIG. 12. However, although this configuration increases the aperture ratio, the number of manufacturing steps increases because of the need of forming the black matrix 16 and 18 on both of the TFT substrate 11 and the opposed substrate 12. In FIG. 12, reference numerals 15 and 19 respectively denote an aluminum wiring line and color filters of R, G and B.

It is now desired to provide a liquid crystal display device which enables light shielding of driver circuit regions without increasing the number of manufacturing steps.

Another object of the invention is to prevent a capacitance from occurring in an interlayer insulating film formed between TFTs of a driver circuit and a black matrix, to reduce, in turn, the delay time of the driver circuit, to thereby produce high-resolution images.

To attain the above objects, according to the invention, there is provided an active matrix liquid crystal display device comprising: a first insulating substrate comprising: a pixel region in which a plurality of pixels having respective thin-film transistors are arranged in matrix form; a driver circuit region for driving the pixel region, the driver circuit region being provided on the same surface as the pixel region and having thin-film transistors; and a black matrix formed over the driver circuit region; a second insulating substrate opposed to the first insulating substrate; and a liquid crystal material interposed between the first and second insulating substrates.

There is also provided an active matrix liquid crystal display device comprising: a first insulating substrate comprising: a pixel region in which a plurality of pixels having respective thin-film transistors are arranged in matrix form and a planation film is formed; a driver circuit region for driving the pixel region, the driver circuit region being provided on the same surface as the pixel region and having thin-film transistors; and a black matrix formed over the first insulating substrate a second insulating substrate opposed to the first insulating substrate: and a liquid crystal material interposed between the first and second insulating substrates.

Further, there is provided a liquid crystal display device comprising: a pair of transparent substrates; a liquid crystal interposed between the pair of transparent substrates; 2n liquid crystal panels that are constituted by using the pair of transparent substrates, where n is a natural number, the 2n liquid crystal panels comprising: active matrix pixel regions; driver circuits arranged around the pixel regions; and a black matrix formed over the first insulating substrate; and means for combining images produced by the 2n liquid crystal panels.

Still further, there is provided a liquid crystal display device comprising: a pair of transparent substrates; a liquid crystal interposed between the pair of transparent substrates; 2n liquid crystal panels that are constituted by using the pair of transparent substrates, where n is a natural number, the 2n liquid crystal panels comprising: active matrix pixel regions each having a planation film; driver circuits arranged around the pixel regions, one side of each of the driver circuits being adjacent to one of the pixel regions, and the other side being adjacent to the other pixel regions or the other driver circuits; and a black matrix formed over the first insulating substrate; and means for combining images produced by the 2n liquid crystal panels.

In the invention, the insulating substrate means a substrate made of a transparent material that has a certain level of strength with respect to external force, for instance, an inorganic material such as glass or quartz.

Where thin-film transistors (hereinafter called TFTs) are formed on a substrate, it is preferred to use a no-alkali glass substrate or a quartz substrate. Where it is intended to reduce the weight of a liquid crystal panel, there may be used a film that is low in birefringence, such as PES (polyethylene sulfate).

A TFT that is formed for each pixel or a peripheral driver circuit may be of a type in which the active layer is made of amorphous silicon or polysilicon.

An ITO (alloy of indium oxide and tin) transparent electrodes are formed on a substrate as electrodes for driving a liquid crystal material. In view of the heat resistance, it is desired to form a black matrix after formation of the ITO electrodes.

To prevent contrast reduction due to irregular reflection within the liquid crystal display device, the black matrix used in the invention may be of a type in which a black material is dispersed in a transparent material. Examples of the transparent material are inorganic materials such as glass and quartz and organic materials such as resin. From the viewpoint of easiness of manufacture, resin materials such as acrylic materials are preferred.

Examples of the black material are carbon black and a pigment. For examples, there may be used organic pigments of phthalocyanine pigments, quinacridon pigments, isoindolinone pigments, azo pigments, anthraquinone pigments, and dioxazine pigments.

Another method of forming the black matrix is to photosensitize a natural polymeric material such as gelatin, or a synthetic polymeric material such as polyvinyl alcohol, or polyvinyl pyrrolidone acrylic resin by a bichromate, then form a fine pattern by a photolithographic process, and finally dye it with an acid dye or a reactive dye.

A further method is to disperse a pigment such as carbon in a photosensitive resin such as a PVA resin, an acrylic resin, or a polyimide resin, and then form a fine pattern by a photolithographic process.

Among the above processes, the method of dispersing carbon black in an acrylic resin is preferred because it can reduce the resistance and form a thin film.

The method of dispersing a black material in a resin material may be selected properly in accordance with the black material used, from a stirring method using a stirrer, a ball mill method, three-roll all method, etc. The dispersiveness of the black material can be improved by adding a small amount of dispersing agent such as a surfactant during a dispersing operation. To stabilize the dispersion and form a thin black matrix layer, it is desired that the average particle diameter of the black material be about 0.1 $\mu$m. If the average particle diameter is larger than this value, there may occur color unevenness and hence the black matrix does not accomplish the intended function.

A black matrix can be formed on a TFT substrate in a manner similar to the manner of forming a resist pattern by an ordinary photolithographic method. That is, an organic solution in which a black material is dispersed is applied to a TFT substrate by spin coating or printing, then patterned by a known photographic method, and finally subjected to post-baking of about 200° C.

The second insulating substrate that is opposed to the substrate on which TFTs are formed made of the same material as the latter. In addition to a transparent electrode, a member such as color filters, a black matrix, and/or a planation film may be formed on the opposed substrate when necessary. Where color filters are formed, first a black matrix is formed on the substrate, then color filters are formed, a planation film is then formed to flatten the uneven surface, and finally a transparent electrode layer is formed.

The liquid crystal material may be a nematic, cholesteric, or smectic material, or a dispersive liquid crystal in which one of those materials is dispersed in a transparent resin material. In particular, because the dispersive liquid crystal does not require the use of a polarizing plate, it can provide a bright panel.

Where a nematic, cholesteric, or smectic liquid crystal material is used, an orientation treatment is performed on one or both of the opposed surface of the pair of substrates to orient the liquid crystal material in a certain direction. The orientation treatment is actually a rubbing treatment in which the substrate surface is rubbed with a cloth or the like directly or through a thin film of an organic or inorganic to material formed on one or both of the substrates.

The substrates that have been subjected to the orientation treatment are so disposed that the orientation-treated surfaces or the surfaces on which TFTs, transparent electrodes, etc. are formed are opposed to each other, and a liquid crystal material is interposed between the opposed substrates. Spacers or the like are distributed between the pair of substrates to provide a constant substrate gap. Spacers having a diameter of 1–10 $\mu$m are used. The pair of substrate are fixed to each other with an epoxy adhesive, for instance. The adhesive is applied to a circumferential portion of the substrates so as to surround the pixel region and the peripheral driver circuit regions.

BRIEF DESCRIPTION OF THE DRAWINGS

FIGS. 1A–1G are sectional views showing a low-temperature polysilicon process according to a first embodiment of the present invention;

DETAILED DESCRIPTION OF THE PREFERRED EMBODIMENTS

Figure 2A:
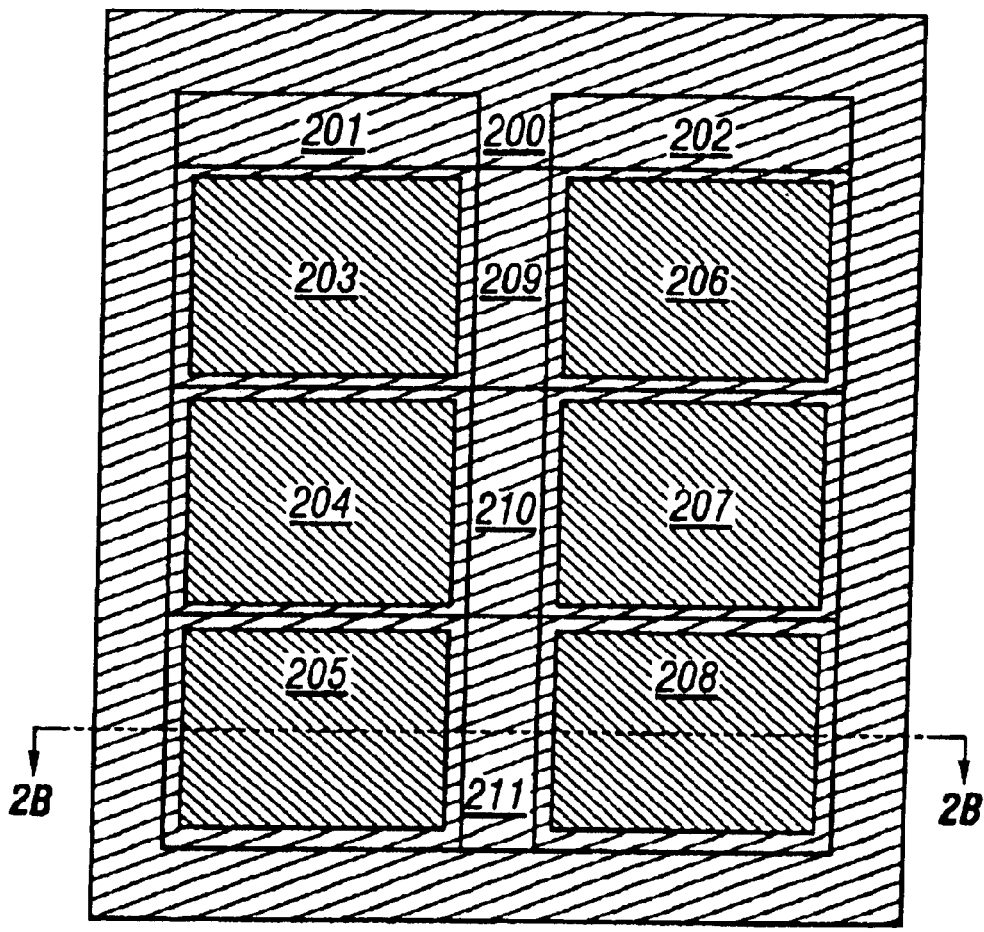
FIGS. 2A and 2B show a general configuration of an integrated active matrix panel according to a second embodiment of the invention.

In the following, there are described manufacturing methods of a substrate of a liquid crystal display device using an active matrix circuit according to the present invention.

Embodiment 1

Referring to FIGS. 1A–1G, a description is made of a manufacturing process of a monolithic active matrix circuit according to a first embodiment of the invention. This is a low-temperature polysilicon process. In FIGS. 1A–1G, the left side shows a manufacturing process of TFTs 99 of a driver circuit and the right side shows a manufacturing process of a TFT 100 of an active matrix circuit.

First, a silicon oxide film of 1,000–3,000 Å in thickness, i.e., an undercoat oxide film 102 is formed on a glass substrate 101 (first insulating substrate) by sputtering or plasma CVD in an oxygen atmosphere.

Then, an amorphous silicon film having a thickness of 300–1,500 Å, preferably 500–1,000 Å, is formed by plasma CVD or LPCVD, and crystallized or improved in crystallinity by thermal annealing at a temperature not lower than 500° C., preferably 500–600° C. Optical annealing (for instance, laser annealing) may be performed after the thermal annealing to further improve the crystallinity. Further, as described in Japanese Patent Laid-Open No. 6-244103 and 6-244104, an element (catalyst element) such as nickel for accelerating crystallization of silicon may be added in the crystallization step by thermal annealing.

Next, the silicon film is etched into island-like active layers 103 (for a P-channel TFT) and 104 (for an N-channel TFT) of TFTs 99 of a driver circuit and an island-like active layer 105 of a TFT (pixel TFT) 100 of a matrix circuit. A silicon oxide gate insulating film 106 of 500–2,000 Å in thickness is then formed by sputtering in an oxygen atmosphere. Alternatively, it may be formed by plasma CVD. In this case, favorable results are obtained by using material gases of dinitrogen monoxide ($N_2O$) or oxygen ($O_2$), and monosilane ($SiH_4$).

Thereafter, an aluminum film of 2,000–6,000 Å in thickness is formed on the entire substrate surface by sputtering. To prevent occurrence of hillocks in a subsequent heating process, the aluminum film may contain silicon, scandium, palladium, or the like. Gate electrodes 107–109 are formed by etching the aluminum film. (FIG. 1A)

The aluminum gate electrodes 107–109 are then anodized. As a result, the surfaces of the gate electrodes 107–109 are formed with aluminum oxide layers 110–112, which serve as insulating layers. (FIG. 1B)

Next, a photoresist mask 113 is so formed as to cover the active layer 103 which constitutes the P-channel TFT of the TFTs 99.

Phosphorus ions are then implanted at a dose of $1 \times 10^{12}$ to $5 \times 10^{13}$ atoms/cm$^2$ through ion doping by using a doping gas of phosphine. As a result, strong N-type regions (sources and drains) 114 and 115 are formed. (FIG. 1C)

Next, a photoresist mask 116 is so formed as to cover the active layer 104 which constitutes the N-channel TFT of the TFTs 99 and the active layer 105 which constitutes the pixel TFT. Boron ions are implanted at a dose of $5 \times 10^{14}$ to $8 \times 10^{15}$ atoms/cm$^2$ through ion doping by using a doping gas of dibarane ($B_2H_6$). As a result strong P-type regions 117 (source and drain) are formed. That is, the strong N-type regions (sources and drains) 114 and 115 and the strong P-type regions (source and drain) 117 are formed by the above doping. (FIG. 1D)

Thereafter, thermal annealing is performed at 450–850° C. for 0.5–3 hours to repair damage by the doping, activate the doped impurities, and restore the crystallinity of silicon. A silicon oxide film of 3,000–6,000 Å in thickness as an interlayer insulating film 118 is then formed over the en re surface through plasma CVD. Alternatively, a silicon nitride film or a multi-layer film of a silicon oxide film and a silicon nitride film may be formed. Contact holes for the sources and drains are formed by etching the interlayer insulating film 118 through wet etching or dry etching.

Then, an aluminum film or a titanium/aluminum multilayer film of 2,000–6,000 Å in thickness is formed through sputtering. By etching this film, electrodes/wiring lines 119–121 of the TFTs 99 of the driver circuit and electrodes/wiring lines 122 and 123 of the pixel TFT 100 are formed. (FIG. 1E) Further, a silicon nitride film 124 of 1,000–3,000 Å in thickness as a passivation film is formed through plasma etching and then etched to form a contact hole that reaches the electrode 123 of the pixel TFT 100. Next, an ITO (indium tin oxide) film of 500–1,500 Å in thickness is formed through sputtering and then etched to form a pixel electrode 125. Further, a 2,000-Å-thick silicon nitride film is formed through plasma CVD and then etched to become an interlayer film 126. (FIG. 1F)

Next, a black matrix 127 made of a resin material is formed in regions excluding the pixel electrodes 125, that is, formed on the TFTs 99 of the driver circuit and on wiring line regions including the pixel TFTs 100. The black matrix 127 is formed by applying, by spin coating or printing, a solution in which carbon black having an average particle diameter of 1,000 Å is dispersed in an acrylic resin material. After prebaking is performed at 100° C. for 2 min, the film is patterned by a known photolithography technique to form a black matrix 127 on all the wiring lines and the TFTs 99 and 100 except only the pixel electrodes 125. (FIG. 1G) This patterning is performed by applying stronger ultraviolet light (more than 20 mW/cm$^2$) than in ordinary patterning, so that the patterning time is insufficient to allow reaction with oxygen. An oxygen shielding film of PVA (polyvinyl alcohol), for instance, may be formed after the application of the black matrix. The reason for the shielding from oxygen is that the existence of oxygen cause the resin material to react with it and the quality of a resulting film is thereby lowered.

The development is performed by using a developing liquid in which TMAH is dissolved in water at 2.36 wt %. As a result, the 1-$\mu$m-thick black matrix 127 was formed on the peripheral driver circuit 99, the pixel TFT 100, and the gate/source wiring lines. The aperture ratio of the pixel region is 60%.

A liquid crystal panel is formed by bonding the thus-formed TFT substrate to an opposed substrate. The substrate gap is made uniform over the entire panel by interposing 5-$\mu$m-diameter spherical spacers between the two substrates. To bond and fix the two substrate to each other, they are sealed with an epoxy adhesive with a pattern that surrounds the pixel region and the peripheral driver circuit regions. After the two substrates are cut into a given shape, a liquid crystal material is injected between the two substrates.

In the liquid crystal display device, since the black matrix is made of a resin material, the interlayer insulating film between the TFTs of the driver circuits and the black matrix has a capacitance is negligibly small.

Although in this embodiment the part of the black matrix formed on the pixel TFTs is made of a resin material, it may be also made of chromium. However, where the black matrix on the driver circuits and that on the pixel TFTs are formed with different materials, the number of manufacturing steps is increased. It is also possible to form no black matrix on the pixel TFTs.

Embodiment 2

Figure 2B:
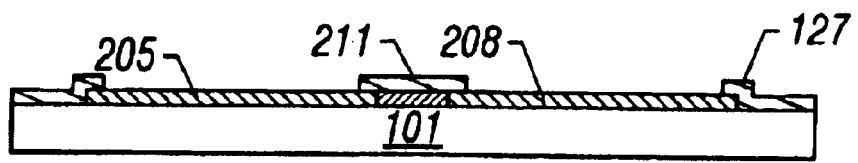

This embodiment is directed to the configuration of an integrated liquid crystal panel which is formed according to the manufacturing method of the first embodiment and in which six panels are unified. FIGS. 2A and 2B show a general configuration of an integrated liquid crystal panel according to this embodiment.

FIG. 2A is a plan view of the integrated liquid crystal panel and shows a general configuration of a substrate on which TFTs are formed. FIG. 2B is a sectional view taken along line A–A' in FIG. 2A. FIGS. 2A and 2B show a state in which the resin black matrix 127 of the first embodiment is formed in peripheral driver circuits 201, 202 and 209–211.

In the peripheral driver circuits, because of a high degree of is integration, such defects as reduce the production yield occur at a high possibility. According to an empirical rule in forming an integrated circuit, the yield is lower in a peripheral portion of a substrate than in its central portion. This is considered due to various factors such as substrate distortion that is more remarkable in a peripheral portion, existence of dust that is higher in probability in a peripheral portion, and a mask registration error.

The reduction in yield due to such various factors becomes more remarkable as the degree of integration of a circuit increases. Therefore, to increase the yield of the entire device, it is effective to form highly integrated circuits in a central portion of a substrate, if possible.

The liquid crystal panel of FIGS. 2A and 2B is characterized in that a first set of panels 203–205 for formation of a color image (R, G and B) and a second set of panels 206–208 for formation of another color image (R', G' and B') are integrated, and that peripheral driver circuits 201, 202 and 209–211 are commonly used for those panels for each of horizontal scanning and vertical scanning.

Embodiment 3

This embodiment is directed to a case where a planation film is provided on a substrate according to the second embodiment on which TFTs are formed. That is, a planation film 428 is provided in a pixel region and regions where a black matrix is formed.

Figure 3A:
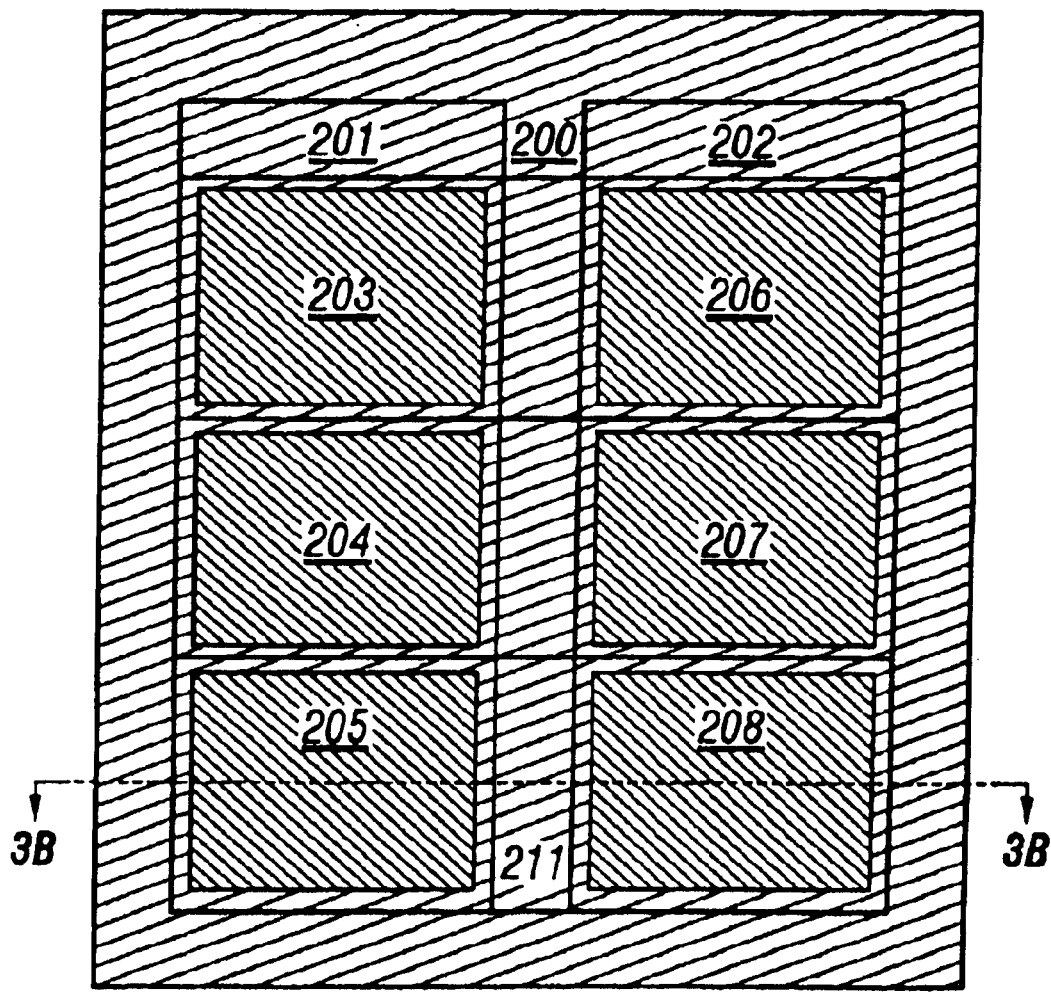
FIGS. 3A and 3B show a general configuration of an integrated active matrix panel according to a third embodiment of the invention.
Figure 3B:
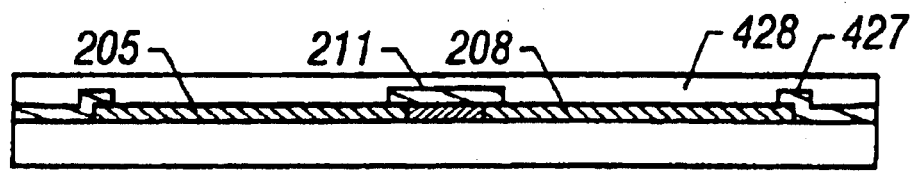

FIGS. 3A and 3B show this embodiment in which the same reference numerals as in the second embodiment denote the same parts.

First, a substrate according to the second embodiment formed with TFTs are produced according to the manufacturing method of the first embodiment. FIGS. 4A–4G show a specific manufacturing process.

First, a silicon oxide film of 1,000–3,000 Å in thickness, i.e., an undercoat oxide film 402 is formed on a glass substrate 401 (first insulating substrate) through sputtering or plasma CVD in an oxygen atmosphere.

Then, an amorphous silicon film having a thickness of 300–1,500 Å, preferably 500–1,000 Å, is formed by plasma CVD or LPCVD, and crystallized or improved in crystallinity by thermal annealing at a temperature not lower than 500° C., preferably 500–600° C. Optical annealing (for instance, laser annealing) may be performed after the thermal annealing to further improve the crystallinity. Further, as described in Japanese Patent Laid-Open No. 6-244103 and 6-244104, an element (catalyst element) such as nickel for accelerating crystallization of silicon may be added in the crystallization step by thermal annealing.

Next, the silicon film is etched into island-like active layers 403 (for a P-channel TFT) and 404 (for an N-channel TFT) of TFTs 399 of a driver circuit and an island-like active layer 405 of a TFT (pixel TFT) 400 of a matrix circuit. A silicon oxide gate insulating film 406 of 500–2,000 Å in thickness is then formed through sputtering in an oxygen atmosphere. Alternatively, it may be formed by plasma CVD. In this case, favorable results are obtained by using material gases of dinitrogen monoxide ($N_2O$) or oxygen ($O_2$), and monosilane ($SiH_4$).

Figure 4A:
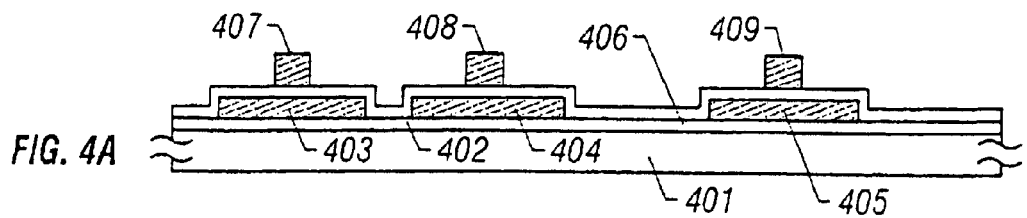
FIGS. 4A–4G are sectional views showing a low-temperature polysilicon process according to the third embodiment of the invention.

Thereafter, an aluminum film of 2,000–6,000 Å in thickness is formed on the entire substrate surface by sputtering. To prevent occurrence of hillocks in a subsequent heating process, the aluminum film may contain silicon, scandium, palladium, or the like. Gate electrodes 407–409 were formed by etching the aluminum film. (FIG. 4A)

Figure 4B:
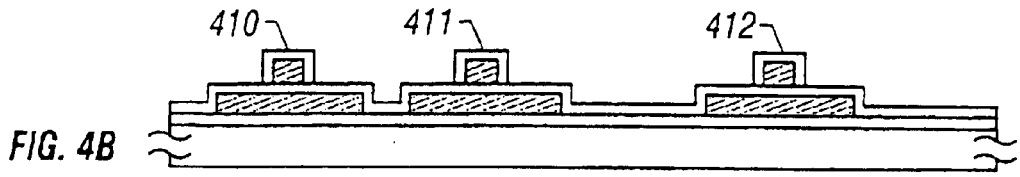

The aluminum gate electrodes 407–409 are then anodized. As a result, the surfaces of the gate electrodes 407–409 are formed with aluminum oxide layers 410–412, which serve as insulating layers. (FIG. 4B)

Figure 4C:
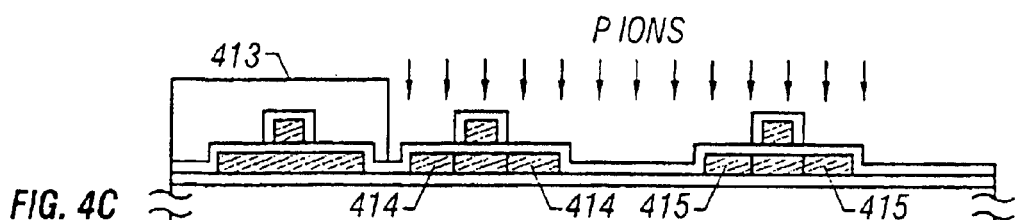

Next, a photoresist mask 413 is so formed as to cover the active layer 403 which constitutes the P-channel TFT of the TFTs 399. Phosphorus ions are then implanted at a dose of $1 \times 10_{12}$ to $5 \times 10^{13}$ atoms/cm$^2$ through ion doping by using a doping gas of phosphine. As a result, strong N-type regions (sources and drains) 414 and 415 are formed. (FIG. 4C)

Figure 4D:
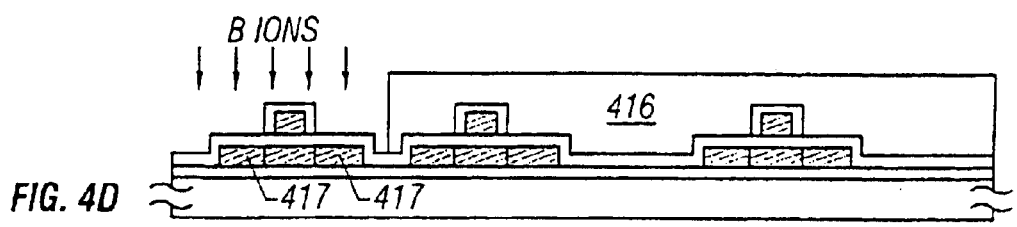
Figure 4E:
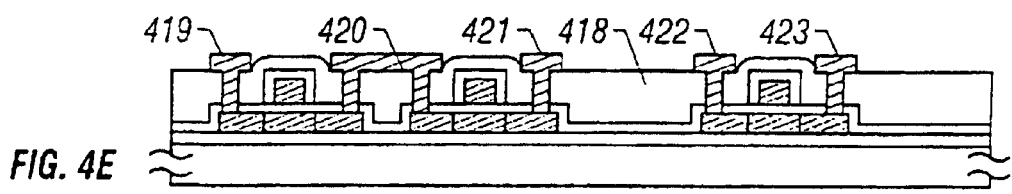

Next, a photoresist mask 416 is so formed as to cover the active layer 404 which constitutes the N-channel TFT of the TFTs 399 and the active layer 405 which constitutes the pixel TFT. Boron ions are implanted at a dose of $5 \times 10^{14}$ to $8 \times 10^{15}$ atoms/cm$^2$ through ion doping by using a doping gas of dibarane ($B_2H_6$)!As a result strong P-type regions 417 (source and drain) are formed. That is, the strong N-type regions (sources and drains) 414 and 415 and the strong P-type regions (source and drain) 417 are formed through the above doping. (FIG. 4D)

Thereafter, thermal annealing is performed at 450–850° C. for 0.5–3 hours to repair damage by the doping, activate the doped impurities, and restore the crystallinity of silicon. A silicon oxide film of 3,000–6,000 Å in thickness as an interlayer insulating film 418 is then formed over the entire surface through plasma CVD. Alternatively, a silicon nitride film or a multi-layer film of a silicon oxide film and a silicon nitride film may be formed. Contact holes for the sources and drains are formed by etching the interlayer insulating film 418 through wet etching or dry etching.

Figure 4F:
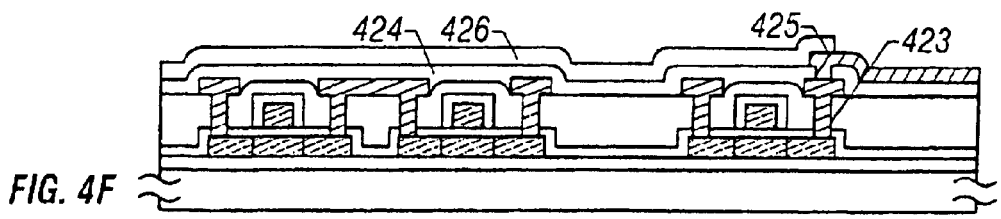

Then, an aluminum film or a titanium/aluminum multi-layer film of 2,000–6,000 Å in thickness is formed through sputtering. By is etching this film, electrodes/wiring lines 419–421 of the TFTs 399 of the driver circuit and electrodes/wiring lines 422 and 423 of the pixel TFT 400 are formed. (FIG. 4E) Further, a silicon nitride film 424 of 1,000–3,000 Å in thickness as a passivation film is formed through plasma etching and then etched to form a contact hole that reaches the electrode 423 of the pixel TFT 400. Next, an ITO (indium tin oxide) film of 500–1,500 Å in thickness is formed through sputtering and then etched to form a pixel electrode 425. Further, a 2,000-Å-thick silicon nitride film is formed through plasma CVD and then etched to become an interlayer film 426. (FIG. 4F)

Next, a black matrix 427 made of a resin material is formed in regions except the pixel electrodes 425, that is, formed on the TFTs 399 of the driver circuit and on wiring line regions including the pixel TFTs 400. The black matrix 427 is formed by applying, through spin coating or printing, a solution in which carbon black having an average particle diameter of 1,000 Å is dispersed in an acrylic resin material. After pre-baking is performed at 100° C. for 2 min, the film is patterned by a known photolithography technique to form a black matrix 427 on all the wiring lines and the TFTs 399 and 400 except only the pixel electrodes 425. This patterning is performed by applying stronger ultraviolet light (more than 20 mW/cm$^2$) than in ordinary patterning so that the patterning time is insufficient to allow reaction with oxygen. Also an oxygen shielding film of PVA (polyvinyl alcohol), for instance, may be formed after the application of the black matrix. The reason for the shielding from oxygen is that the existence of oxygen may cause the resin material to react with it and the quality of a resulting film is thereby lowered.

The development is performed by using a developing liquid in which TMAH is dissolved in water at 2.36 wt %. As a result, the 1-$\mu$m-thick black matrix 427 is formed on the peripheral driver circuit 399, the pixel TFT 400, and the gate/source wiring lines. The aperture ratio of the pixel region is 60%.

Figure 4G:
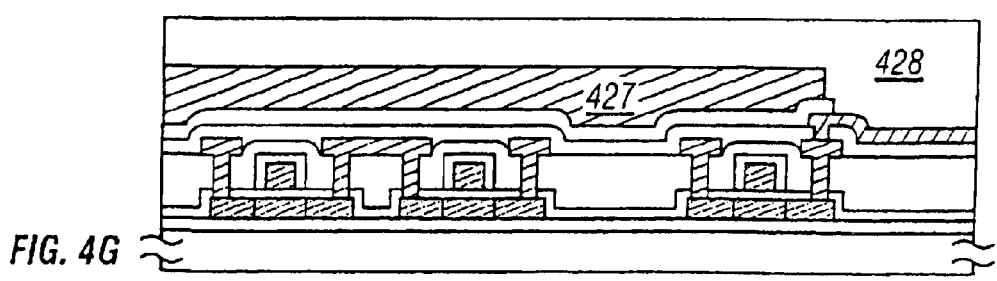

Next, the surface is planarized by applying a resin liquid mainly made of an acrylic resin to the black matrix 427 and the pixel region with a spin coater. The resin liquid is completely set into the planation film 428 by a heat treatment of 170° C. and 3 hours. The planation film 428 has a thickness of 1–2 $\mu$m. (FIG. 4G)

Examples of the material of the planation film 428 other than the acrylic resin as mentioned above include an aminosilane modified epoxy resin and a polyimide resin.

Where a planation film is formed as in this embodiment, a flat orientation film can be formed in the pixel region, resulting in improved orientation of a liquid crystal.

A liquid crystal panel is formed by bonding the thus-formed TFT substrate to an opposed substrate. The substrate gap is made uniform over the entire panel by interposing 5-$\mu$m-diameter spherical spacers between the two substrates. To bond and fix the two substrates to each other, they are sealed with an epoxy adhesive with a pattern that surrounds the pixel region and the peripheral driver circuit regions. After the two substrates are cut into a given shape, a liquid crystal material is injected between the two substrates.

In the liquid crystal display device, since the black matrix is made of a resin material, the interlayer insulating film between the TFTs of the driver circuits and the black matrix has a capacitance is negligibly small.

Although in this embodiment the part of the black matrix formed on the pixel TFTs is made of a resin material, it may be made of chromium. However, where the black matrix on the driver circuits and that on the pixel TFTs are formed with different materials, the number of manufacturing steps is increased. It is also possible to form no black matrix on the pixel TFTs.

Embodiment 4

This embodiment is directed to a case where a special feature is added to the TFT manufacturing processes of the first and third embodiments. This embodiment relates to a manufacturing method that has a feature for preventing semiconductor devices being manufactured from being broken by a high voltage pulse that is imparted from plasma in performing plasma CVD or sputtering.

Figure 5A:
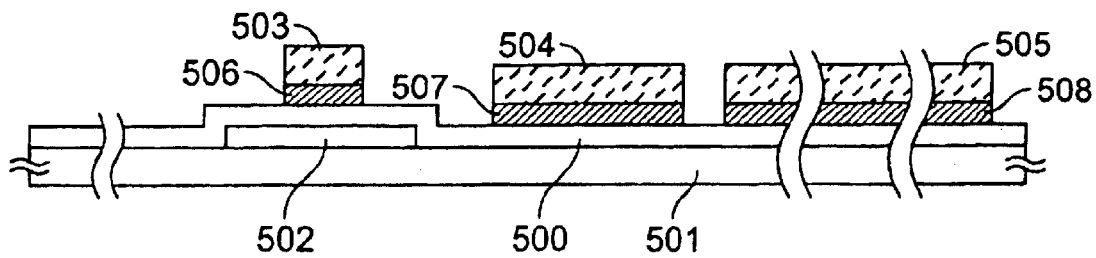
FIGS. 5A–5F and FIGS. 6A–6D show a manufacturing process of an active matrix liquid crystal display device according to a fourth embodiment of the invention.

FIGS. 5A–5F and 6A–6D show a general manufacturing process according to this embodiment. First, a step of FIG. 5A is described. A 3,000-Å-thick silicon oxide film as an undercoat film (not shown) is formed on a glass substrate 501 through plasma CVD or sputtering. Alternatively, the substrate 501 may be a quartz substrate.

Next, a 500-Å-thick amorphous silicon film (not shown) as a starting film of an active layer 502 is formed through plasma CVD or low-pressure thermal CVD. A crystalline silicon film (not shown) is obtained by crystallizing the amorphous silicon film by heating and/or laser light application. Alternatively, a crystalline silicon film may be formed directly through low-pressure thermal CVD or plasma CVD.

The crystalline silicon film thus obtained is patterned into an active layer 502 (see FIG. 5A) for a thin-film transistor by using a first mask.

Next, a 1,000-Å-thick silicon oxide film 500 to serve as a gale insulating film is formed through plasma CVD.

Further, an aluminum film (not shown) for first-layer wiring lines 506–508 (see FIG. 5A) is formed through sputtering or electron beam evaporation.

To suppress occurrence of hillocks and whiskers in subsequent steps, it is effective that the aluminum film contain Sc, Y, or at least one of element selected from the lanthanoids and actinoids. In this embodiment, Sc is included in the aluminum film at 0.1 wt %.

Hillocks and whiskers are needle or prickle-like protrusions that may be formed on the surface of an aluminum film when the film is heated to more than 300° C. or it is illuminated with laser light.

Further, a very thin, dense anodic oxide film (not shown) is formed on the surface of the aluminum film (not shown) to improve the adhesiveness of resist masks 503–505 to be formed on the aluminum film.

The anodization is performed by using an electrolyte that an ethylene glycol solution containing 3%-tartaric acid neutralized with aqueous ammonia. That is, the anodization is performed in the electrolyte with the aluminum film and a platinum plate used as the anode and cathode, respectively. The thickness of a resulting dense anodic oxide film is set at 150 Å. The thickness of a dense anodic oxide film can generally be controlled by the application voltage.

Resist masks 503–505 are then formed on the aluminum film. By virtue of the dense anodic oxide film (not shown) formed on the aluminum film, superior adhesiveness are attained between the resist masks 503–505 and the aluminum film. A second mask is used in forming the resist masks 503–505.

Next, the aluminum film is patterned by using the resist film masks 503–505 into a gate electrode 506 and a gate line (not shown) extending therefrom, a part 507 of a shorting line for connecting the gate line and a source line later, and a part 508 of a wiring line for supplying current in later anodization of the gate electrode 506. Thus, a state of FIG. 5A is obtained.

Figure 5B:
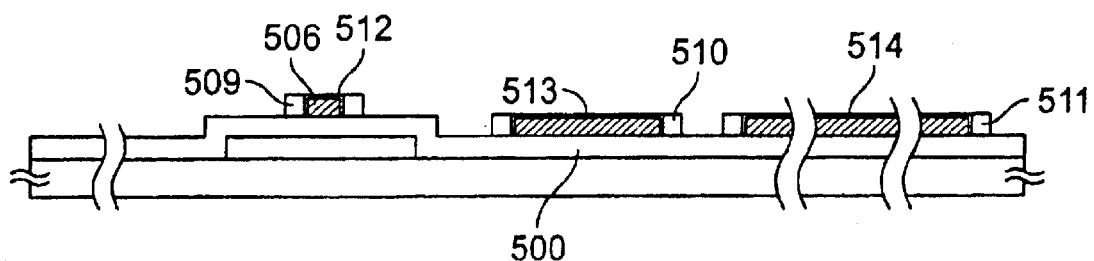

Next, with the resist masks 503 and 505 left as they are, porous anodic oxide films 509–511 are formed as shown in FIG. 5B by using a 3% aqueous solution of oxalic acid. Specifically, the anodization is performed in the above aqueous solution by electrifying between the first-layer wiring lines 506–508 (anode) formed in the FIG. 5A step and a platinum plate (cathode).

Because of the existence of the resist masks 503–505 on the respective aluminum patterns 506–508, the electrolyte does not contact with the top surfaces of the aluminum patterns 506–508 and hence the anodization proceeds only on the side faces of the respective patterns 506–508.

This anodization is performed by electrifying through the current supply line for anodization (reference numeral 508 denotes its part) to prevent a case that voltage drops otherwise cause resulting anodic oxide films to have different thicknesses at opposite ends of the active matrix region. In particular, the use of the current supply lines is necessary to produce a large-area liquid crystal panel.

The growth distance of the porous anodic oxide films 509–511 can be controlled by the anodization time, and can be selected from an approximate range of 3,000–10,000 Å. In this embodiment, the thickness (growth distance) of the porous anodic oxide films 509–511 is set at 5,000 Å. The dimension of low-concentration impurity regions (formed later) can generally be determined by the growth distance of the porous anodic oxide film 509.

As described later in detail, the porous anodic oxide regions 509–511 have the following important roles:

formation of low-concentration impurity regions (generally called LDD regions); and suppressing the occurrence of defects at crossing points of the first-layer and second-layer wiring lines.

After the formation of the porous anodic oxide films 509–511 (see FIG. 5B), the resist films 503–505 (not shown in FIG. 5B) are removed and then the 150-Å-thick, dense anodic oxide films (not shown) are also removed.

Thereafter, dense anodic oxide films 512–514 are formed, which are very effective in suppressing the occurrence of hillocks and whiskers.

The dense anodic oxide films 512–514 are formed by using an electrolyte that an ethylene glycol solution containing 3%-tartaric acid neutralized with aqueous ammonia,.

In this step, since the electrolyte enters the porous anodic oxide films 509–511, the dense anodic oxide films 512–514 are formed on the surfaces of the residual aluminum electrodes and wiring lines 506–508.

Also in this anodization step, anodization current is supplied through the current supply line for anodization (reference numeral 508 denotes its part), to uniformize the thickness of the resulting anodic oxide films over the entire active matrix region.

The thickness of the dense anodic oxide films 512–514 was set at 800 Å. If the thickness of the dense anodic oxide films 512–514 were made thicker (for instance, more than 2,000 Å), offset regions later formed in the active layer could also be made thicker as much. However, to this end, the application voltage needs to be increased to more than 200 V, which is not preferable in terms of reproducibility and safety of operation. Therefore, in this embodiment, to obtain the effects of suppressing the occurrence of hillocks and whiskers and increasing the breakdown voltage, the thickness of the dense anodic oxide films 512–514 is set at 800 Å.

As a result of the above step, the gate electrode and gate line 506 is formed as shown in FIG. 5B, whose dimension is smaller than the corresponding dimension in FIG. 5A by the anodization.

The dense anodic oxide films 513 and 514 and the porous anodic oxide films 510 and 511 are also formed around the part 507 of the shorting line for connecting the gate line 506 and the source line and the part 508 of the current supply line for anodization of the gate electrode 506.

Figure 5C:
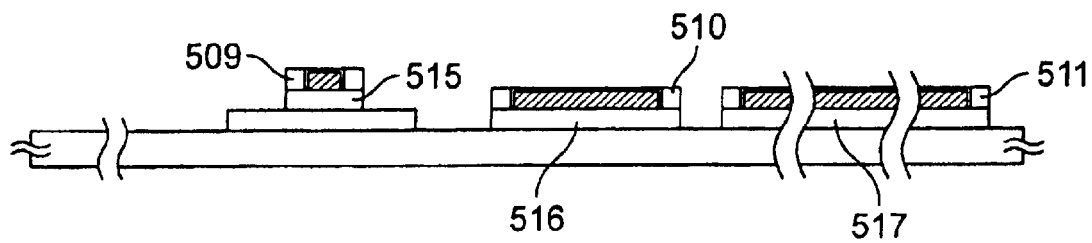

Thus, a state of FIG. 5B is obtained. Thereafter, the exposed portions of the silicon oxide film 503 are removed to form low-concentration impurity regions in the active layer 502 of the thin-film transistor. Thus, a state of FIG. 5C is obtained, in which silicon oxide films 515–517 remained.

Figure 5D:
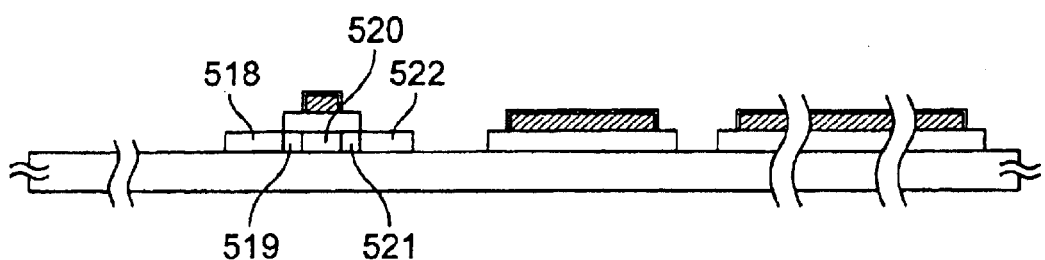

Next, the porous anodic oxide films 509–511 are removed (see FIG. 5D). They can be removed selectively by using a mixed acid of phosphoric acid, acetic acid, and nitric acid.

In this state, impurity ions are implanted to form source and drain regions of the thin-film transistor. Specifically, phosphoric ions are implanted to form an N-channel thin-film transistor. To form a P-channel thin-film transistor rather than an N-channel one, boronic ions may be implanted.

In this step, a source region 518 and a drain region 522 as well as low-concentration impurity regions 519 and 521 are formed in a self-aligned manner. The low-concentration regions 521 that is formed between a channel forming region 520 and the drain region 522 is usually called a lightly doped drain. (FIG. 5D)

The low-concentration impurity regions 519 and 521 are very effective in producing a thin-film transistor having a small off-current characteristic. In particular, obtaining a small off-current characteristic by forming low-concentration impurity regions is advantageous in a thin-film transistor provided in each pixel of an active matrix region because it is required to have such a characteristic.

After the implantation of impurity ions, laser light is applied to activate the implanted impurity ions and to anneal the regions which are damaged by the ion implantation. In this operation, the previously formed dense anodic oxide films 512–514 prevent hillocks and whiskers from occurring in the gate electrode 506 and the wiring lines 507 and 508.

Next, a 4,000-Å-thick silicon oxide film to serve as a first interlayer insulating film 523 is formed through plasma CVD using a TEOS material gas.

Alternatively, the interlayer insulating film may be a silicon nitride film or a silicon oxynitride film. In the case of forming a silicon nitride film, plasma CVD may be used with a material gas of ammonia. In the case of forming a silicon oxynitride film, plasma CVD may be used with material gases of TEOS and $N_2O$.

As a further alternative, the first interlayer insulating film 523 may be a laminate film of a plurality of films selected from a silicon oxide film, a silicon nitride film, and a silicon oxynitride film.

Figure 5E:
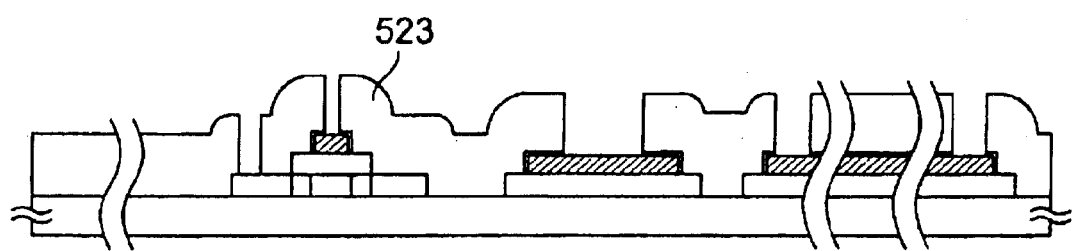

Thereafter, contact holes are formed through the first interlayer insulating film 523 by using a third mask, to obtain a state of FIG. 5E.

Second-layer electrodes and wiring lines (usually called second-layer wiring lines) are then formed each of which is a three-layer film consisting of a titanium film, an aluminum film, and a titanium film. The thickness of the titanium films may be less than several hundred angstrom because they are merely used to obtain good contact. A fourth mask is used in this step.

Although each of the second-layer wiring layers may be a single-layer aluminum film, the above-mentioned three-layer film is used in this embodiment to obtain good contact with other electrodes and wiring lines.

It is necessary to use different etchants for the etching of the titanium films and the aluminum films. In this embodiment, ammonium peroxide is used for the etching of the titanium films and an aluminum mixed acid was used for the etching of the aluminum films.

Figure 5F:
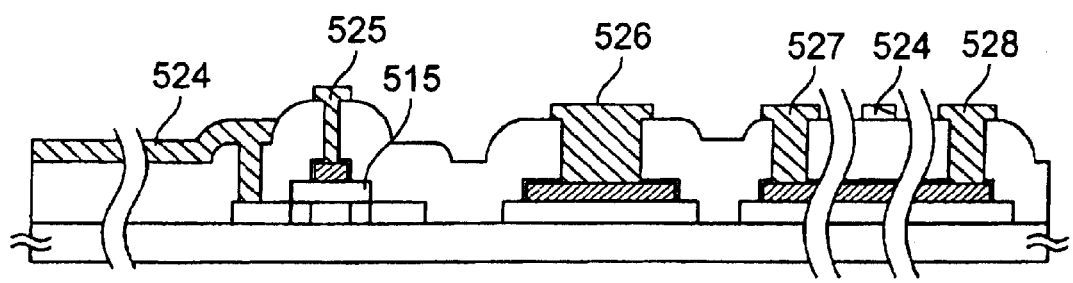

Thus, a state of FIG. 5F is obtained. In FIG. 5F, reference numeral 524 denotes a source electrode and wiring line and 525 denotes a gate electrode. The gate electrode 525 is so formed as to extend from the gate line 506, though it is not shown in FIG. 5F. The wiring lines and electrodes 524 and 525 are second-layer wiring lines.

The source line 524 and the gate electrode (gate line) 525, which are second-layer wiring lines, are connected to each other via a shorting line. This structure eliminates a voltage difference between the source line 524 and the gate electrode 525.

The source line 524 is so formed as to cross, i.e., overpass the current supply line 508 for anodization with the first interlayer insulating film 523 interposed in between.

FIG. 5F also shows dummy electrodes (called "electrodes" for convenience of description) 526–528 which do not serve as electrodes or wiring lines but are used in a later dividing step. That is, they play their roles in dividing the wiring line 507 and 508 in the final step.

Next, a 4,000-Å-thick silicon oxide film as a second interlayer insulating film 529 is formed. Alternatively, the second interlayer insulating film 529 may be a silicon nitride film, a silicon oxynitride film, or a laminate film consisting of those insulating films and a silicon oxide film.

During the formation of the second interlayer insulating film 529, the source line 524 and the gate electrode 525 are short-circuited with each other via the shorting line 507. There, it can be avoided that plasma causes a voltage difference between the source line 524 and the gate electrode 525 and the voltage difference in turn electrostatically breaks down the gate insulating film (silicon oxide film) 515.

Figure 6A:
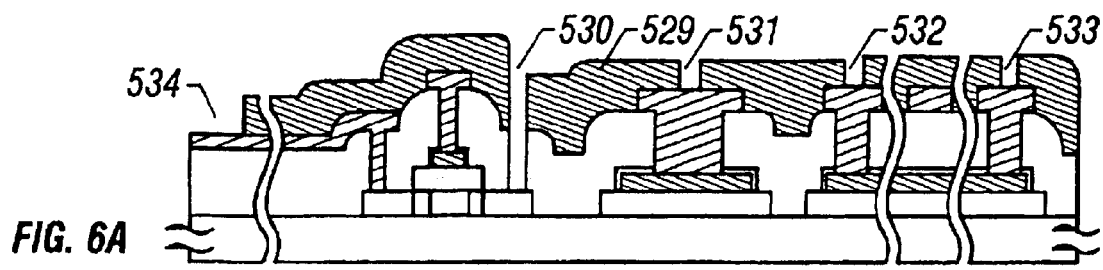

Next, contact holes 530–533 are formed by using a fifth mask, to obtain a state of FIG. 6A. Reference numeral 530 denotes a contact hole for the drain region 522, an opening 531 that is necessary to divide the wiring line 507, and openings 532 and 533 that are necessary to divide the wiring line 508.

In this step, the surface of an end portion 534 of the source electrode and wiring line 524 is exposed, which portion later served as an external lead-out terminal. Actually, the source line 524 is connected to a peripheral driver circuit for driving the active matrix circuit and the terminal 534 is an external terminal of this peripheral driver circuit. However, to avoid complexity, the peripheral driver circuit is not shown in FIGS. 6A–6D.

Figure 6B:
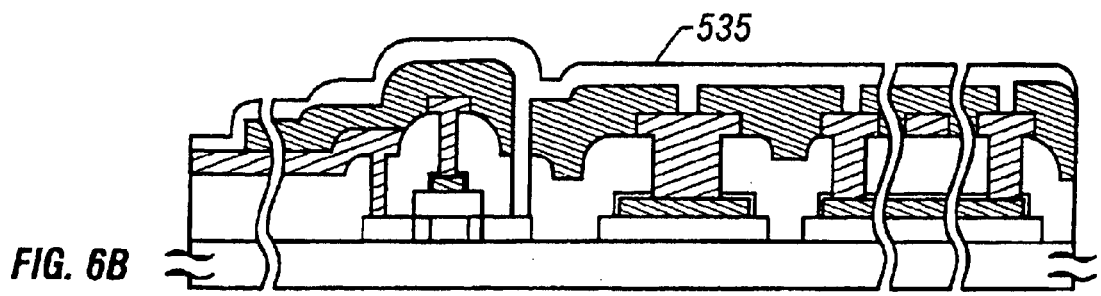

Next, an ITO electrode 535 to constitute pixel electrodes is formed through sputtering, to obtain a state of FIG. 6B. The ITO electrode 535 is then patterned into a pixel electrode 536 by using a sixth mask.

In forming the pixel electrode 536, after the removal of unnecessary portions of the ITO electrode 535, the etching is continued to form holes through the electrodes (dummy electrodes; second-layer wiring lines) 526–528 and the first-layer wiring lines 507 and 508.

That is, the openings 531–533 are extended through the second-layer and first-layer wiring lines, whereby the wiring lines 507 and 508 are divided.

In the above etching, since each of the second wiring lines is a laminate films of a titanium film and an aluminum film, different etchants need to be used for the respective films.

Figure 6C:
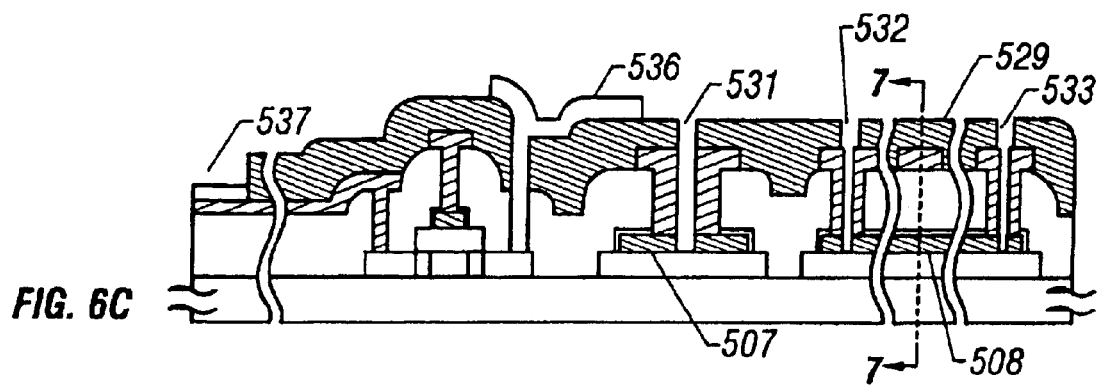
Figure 6D:
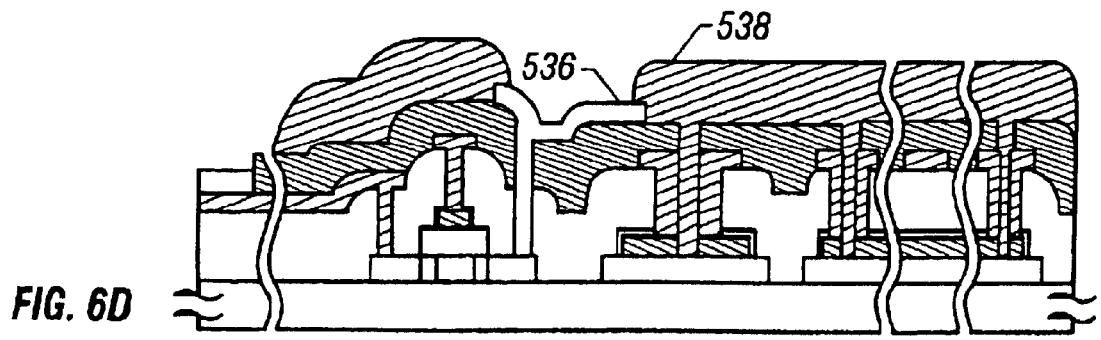

Thus, a state of FIG. 6C is obtained. Since the above step is performed at the same time as the pixel electrode 536 is formed by patterning, there is no need of using a new mask.

The reason why the first-layer and second-layer wiring lines can be removed at the same time is that only the metal materials can be removed selectively while the insulating films of silicon oxide films etc. are left.

In the above step, a part of the ITO film 537 was left on the surface of the lead-out electrode 534 of the liquid crystal panel extending from the source line 524. This ITO film serves as a buffer layer for preventing corrosion and mutual diffusion between the lead out terminal 534 and a metal wiring line or a conductive pad that is to contact with the lead-out terminal 534.

For the following reason, it is important that the current supply line 508 for anodization be divided at the portions 532 and 533. In a subsequent liquid crystal panel assembling process, a rubbing resin film is so formed as to cover the second interlayer insulating film and then rubbing is performed to orient a liquid crystal. In this operation, since the wiring line 508 is electrically in a floating state, there can be prevented an event that an undesired voltage difference occurs between the source line 524 and the wiring line 508.

As shown in FIG. 6C, the wiring lines 507 and 508 are divided at one location and two locations, respectively. The dividing positions may be set as desired.

Figure 7:
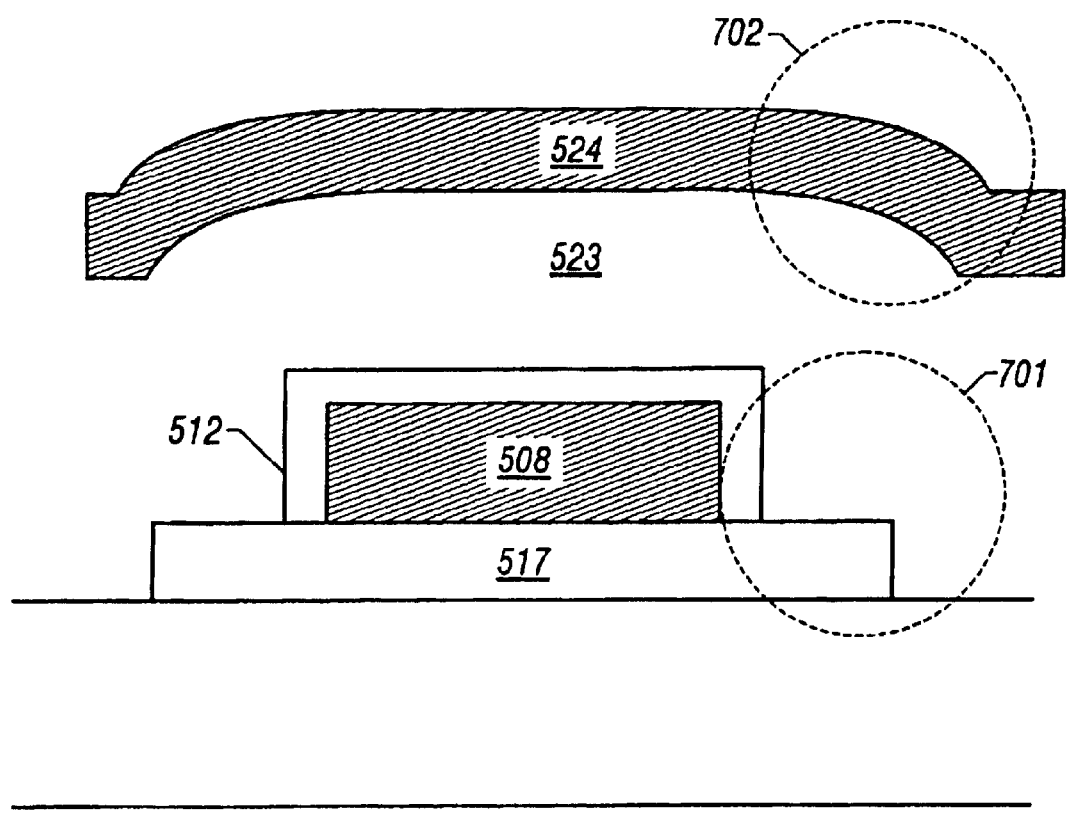
FIG. 7 is a sectional view taken along line A–A' in FIG. 6C.

FIG. 7 is a sectional view taken along line A–A' in FIG. 6C. As shown in FIG. 7, the source line 524 overpasses the current supply wiring line 508 for anodization to provide a crossing. It is noted that a portion 701 of the wiring line 508 has a step-like shape because of the previous formation of the porous anodic oxide film.

Therefore, a portion 702 of the first interlayer insulating film 523 is given a gently sloped surface, which prevents the source line 524 from being cut due to the existence of a step.

In the state of FIG. 6C, a black matrix 538 made of a resin material was formed in regions except the pixel electrodes, that is, formed on the TFTs of the driver circuit and on wiring line regions including the pixel TFTs. (FIG. 6D) The black matrix 538 is formed by applying, through spin coating or printing, a solution in which carbon black having an average particle diameter of 1,000 Å is dispersed in an acrylic resin material. After pre-baking is performed at 100° C. for 2 min, the film is patterned by a known photolithography technique to form a black matrix 538 on all the wiring lines and the TFTs except only the pixel electrodes. This patterning is performed by applying stronger ultraviolet light (more than 20 mW/cm$^2$) than in ordinary patterning so that the patterning time is insufficient to allow reaction with oxygen. also an oxygen shielding film of PVA (polyvinyl alcohol), for instance, may be formed after the application of the black matrix. The reason for the shielding from oxygen is that the existence of oxygen may cause the resin material to react with it and the quality of a resulting film is thereby lowered.

The development is performed by using a developing liquid in which TMAH is dissolved in water at 2.36 wt %. As a result, the 1-$\mu$m-thick black matrix 538 is formed on the peripheral driver circuit, the pixel TFT, and the gate/source wiring lines. The aperture ratio of the pixel region is 60%.

A liquid crystal panel is formed by bonding the thus-formed TFT substrate to an opposed substrate. The substrate gap is made uniform over the entire panel by interposing 5-$\mu$m-diameter spherical spacers between the two substrates. To bond and fix the two substrate to each other, they are sealed with an epoxy adhesive with a pattern that surrounds the pixel region and the peripheral driver circuit regions. After the two substrates are cut into a given shape, a liquid crystal material is injected between the two substrates.

In the liquid crystal display device thus formed, since the black matrix 538 is made of a resin material, the interlayer insulating film between the TFTs of the driver circuits and the black matrix 538 has a capacitance is negligibly small.

In forming the black matrix 538, the openings 531–533 are filled with the material of the black matrix 538. Since this material is a resin material, filling the openings 531–533 with the material of the black matrix 538 is effective in providing high reliability.

Figure 8:
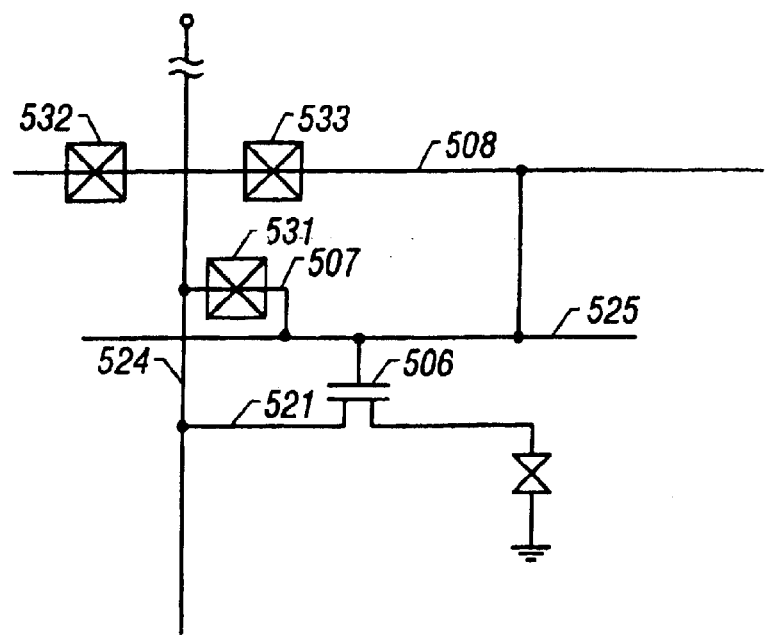
FIG. 8 is a circuit diagram showing part of an active matrix circuit according to the fourth embodiment of the invention.

FIG. 8 shows part of an active matrix circuit of an active matrix liquid crystal panel which circuit is employed in this embodiment. FIG. 8 does not include a peripheral driver circuits for inputting drive signals to the source line 524 and the gate line 525.

In the configuration of FIG. 8, the gate line 525 and the source line 524 are short-circuited by the shorting line 507. The shorting line 507 is divided by the opening 531 in the step of FIG. 6C.

In the step of FIG. 6C, the current supply line 508 for anodization is divided by the openings 532 and 533. The source line 524 overpasses the portion of the current supply line 508 extending between the dividing portions with the interlayer insulating film 523 interposed in between.

Embodiment 5

This embodiment is directed to the shape of a first-layer wiring line that is divided by openings such as the openings 532 and 533 shown in FIG. 6C. For example, the wiring line 508 becomes unnecessary once the anodization is finished. However, there is a concern that a pulse current caused by local abnormal discharge may flow through the long wiring line 508 during the formation of the first interlayer insulating line 523 or the second interlayer insulating line 529.

In forming the first interlayer insulating line 523 or the second interlayer insulating line 529, the wiring line 508 is connected to each gate electrode. Therefore, if a pulse current flows through the wiring line 508, a pulse voltage is applied to each gate electrode.

Figure 9A:
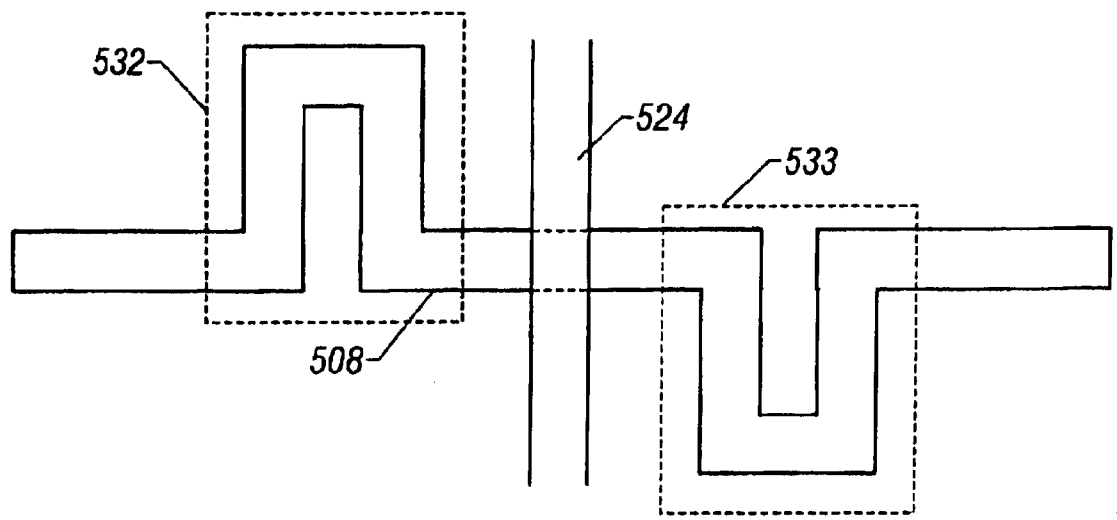
FIGS. 9A and 9B show the shape of a wiring line according to a fifth embodiment of the invention.
Figure 9B:
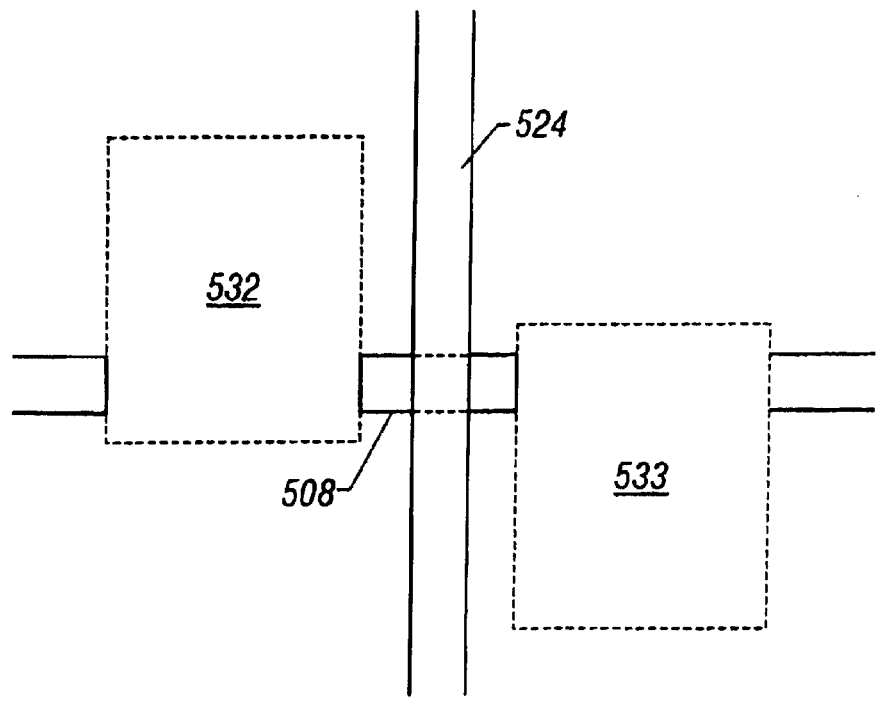

To solve this problem, in this embodiment, the wiring line 508 has a bracket shape at the dividing portions as shown in FIG. 9A, so that a pulse current is caused to disappear or attenuate at those portions. FIGS. 9A and 9B show states before and after the dividing.

The bracket-shaped portions are removed by the openings 532 and 533 shown in FIG. 6C. Although this configuration requires the openings 532 and 533 to be increased in size, it can be said that the increase in the size of the openings 532 and 533 is, rather, preferable if taking account of the viscosity etc. of the black matrix material that is finally filled up.

Embodiment 6

This embodiment is directed to a case where a planation film 539 is formed after the TFT manufacturing process of the fourth embodiment in the pixel region and the region where black matrix is formed.

Figure 10:
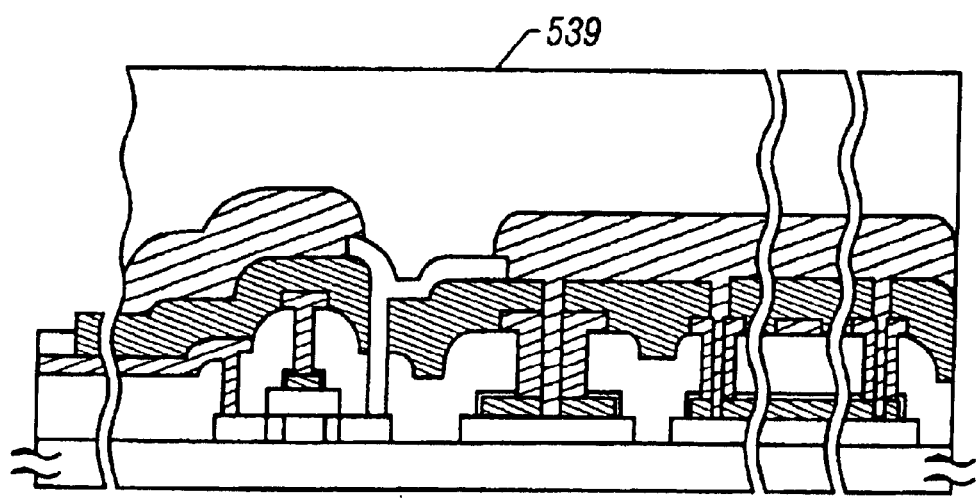
FIG. 10 shows a liquid crystal display device having a planation film according to a sixth embodiment of the invention.
Figure 11A:
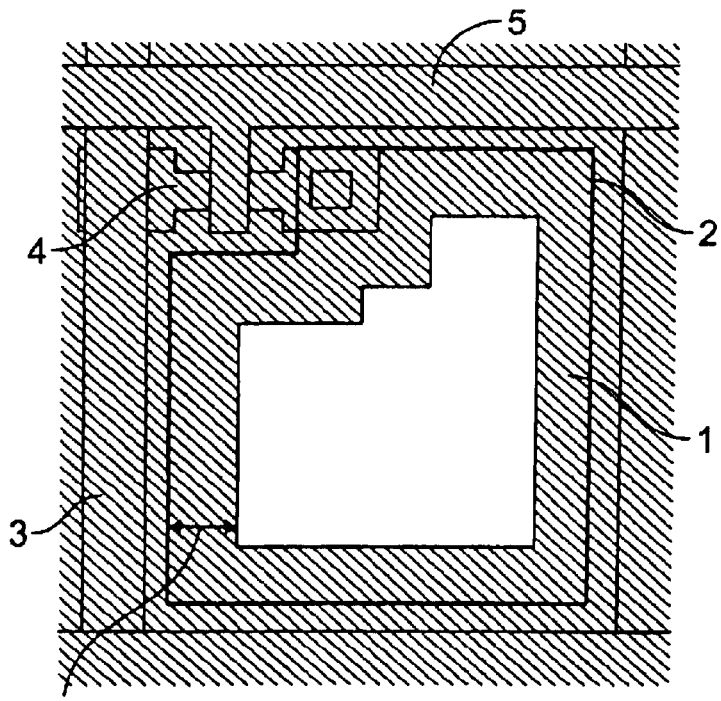
FIGS. 11A and 11B show examples of active matrix liquid crystal display devices.
Figure 11B:
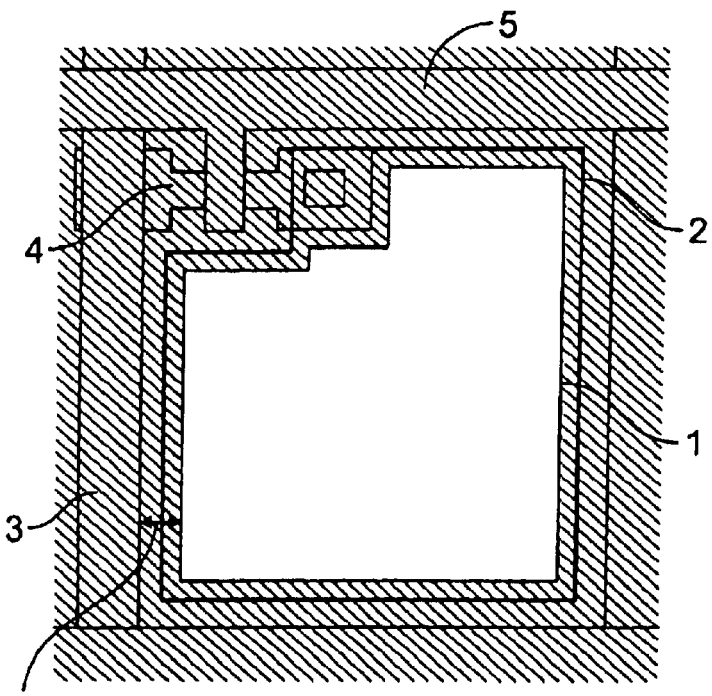
Figure 12:
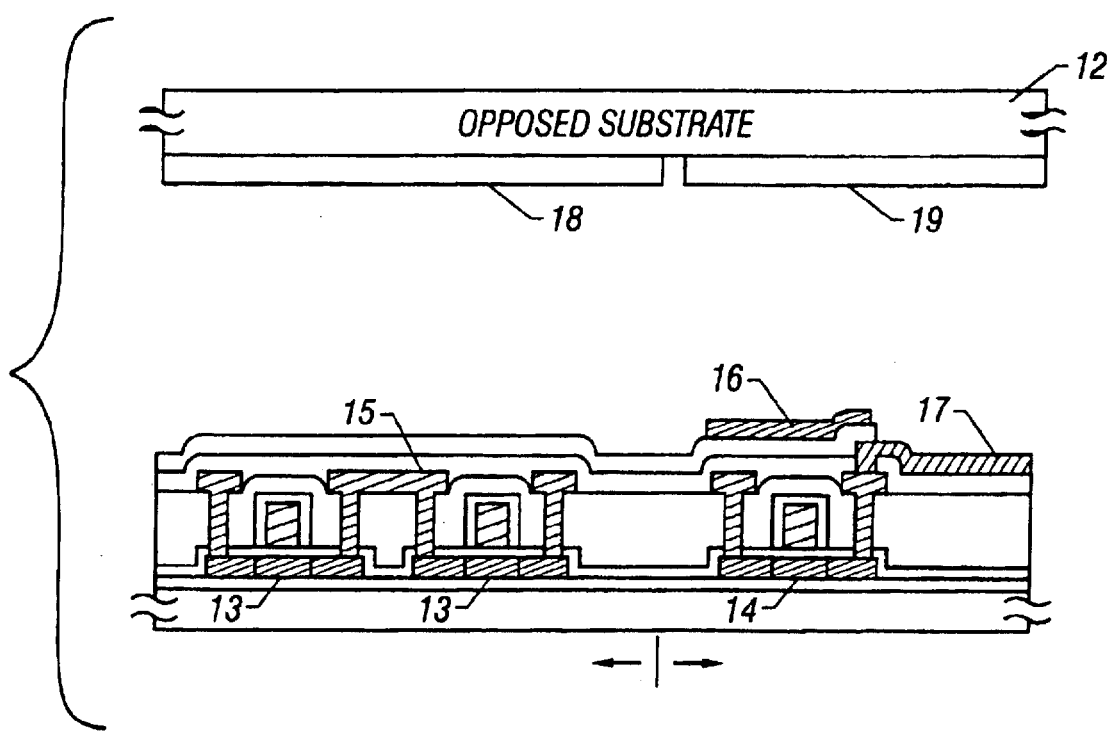
FIG. 12 shows another example of an active matrix liquid crystal display device.

After the black matrix is formed by the same process as in the fourth embodiment, the planation film 539 is formed by the same planation film forming method as in the third embodiment. An example is shown in FIG. 10.

According to the invention, by employing, in a liquid crystal display device, the structure in which a black matrix is formed on a peripheral driver circuit, it can be prevented that a capacitance occurs in an interlayer insulating film formed between TFTs of the driver circuit and the black matrix. As a result, the delay time of the driver circuit can be reduced, which makes it possible to produce high-resolution images.

By utilizing the invention, the whole structure of a liquid crystal display device can be made as simple as possible and its manufacturing cost can be reduced while high-quality images can be produced.

Further, by properly arranging peripheral driver circuits, reduction in production yield can be avoided even if the degree of integration of a liquid crystal panel is increased.

What is claimed is:

1. A display device comprising:
   a first substrate;
   a second substrate opposed to said first substrate;
   a thin film transistor having an active layer comprising amorphous semiconductor comprising silicon provided over said first substrate;
   a color filter provided over said second substrate;
   a resin black matrix provided over said second substrate and comprising a resin and a a carbon black; and
   a planation film provided over said second substrate,
   wherein said carbon black has an average diameter greater than zero and up to about 0.1 $\mu$m.

2. A display device comprising:
   a first substrate;
   a second substrate opposed to said first substrate;
   a thin film transistor having an active layer comprising amorphous semiconductor comprising silicon provided over said first substrate;
   a color filter provided over said second substrate; and
   a resin black matrix provided over said second substrate and comprising a resin and a a carbon black,
   wherein said carbon black has an average diameter greater than zero and up to about 0.1 $\mu$m.

3. The device of claim 2 further comprising a liquid crystal provided between said first substrate and said second substrate, said liquid crystal being selected from the group consisting of a nematic liquid crystal, a cholesteric liquid crystal, a smectic liquid crystal, and a dispersive liquid crystal in which one of said nematic liquid crystal, said cholesteric liquid crystal and said smectic liquid crystal is dispersed in a transparent resin material.

4. The device of claim 2 wherein said resin comprises an acrylic resin.

5. The device of claim 1 further comprising a liquid crystal provided between said first substrate and said second substrate, said liquid crystal being selected from the group consisting of a nematic liquid crystal, a cholesteric liquid crystal, a smectic liquid crystal, and a dispersive liquid crystal in which one of said nematic liquid crystal, said cholesteric liquid crystal and said smectic liquid crystal is dispersed in a transparent resin material.

6. The device of claim 1 wherein said resin comprises an acrylic resin.

7. A display device comprising:
a first substrate;
a second substrate opposed to said first substrate;
a thin film transistor having an active layer comprising amorphous semiconductor comprising silicon provided over said first substrate;
a resin black matrix provided over said second substrate and comprising a resin and a carbon black; and
a planation film provided over said second substrate,
wherein said carbon black has an average diameter greater than zero and up to about 0.1 μm.

8. The device of claim 7 further comprising a liquid crystal provided between said first substrate and said second substrate, said liquid crystal being selected from the group consisting of a nematic liquid crystal, a cholesteric liquid crystal, a smectic liquid crystal, and a dispersive liquid crystal in which one of said nematic liquid crystal, said cholesteric liquid crystal and said smectic liquid crystal is dispersed in a transparent resin material.

9. The device of claim 7 wherein said resin comprises an acrylic resin.

10. A display device comprising:
a first substrate;
a second substrate opposed to said first substrate;
a thin film transistor provided over said first substrate and comprising a source region, a drain region, a channel forming region provided between said source region and said drain region, at least said channel forming region comprising an amorphous semiconductor comprising silicon;
a color filter provided over said second substrate;
a resin black matrix provided over said second substrate and comprising a resin and a carbon black; and
a planation film provided over said second substrate,
wherein said thin film transistor further comprises a low-concentration impurity region provided between said channel forming region and at least one of said source region and said drain region, and
wherein said carbon black has an average diameter greater than zero and up to about 0.1 μm.

11. The device of claim 10 further comprising a liquid crystal provided between said first substrate and said second substrate, said liquid crystal being selected from the group consisting of a nematic liquid crystal, a cholesteric liquid crystal, a smectic liquid crystal, and a dispersive liquid crystal in which one of said nematic liquid crystal, said cholesteric liquid crystal and said smectic liquid crystal is dispersed in a transparent resin material.

12. The device of claim 11 wherein said resin comprises an acrylic resin.

13. The device of claim 10 wherein said resin comprises an acrylic resin.

14. A display comprising:
a first substrate:
a second substrate opposed to said first substrate;
a thin film transistor provided over said first substrate and comprising a source region, a drain region, a channel forming region provided between said source region and said drain region, at least said channel forming region comprising an amorphous semiconductor comprising silicon;
a color filter provided over said second substrate; and
a resin black matrix provided over said second substrate and comprising a resin and a carbon black,
wherein said thin film transistor further comprises a lowconcentration impurity region provided between said channel forming region and at least one of said source region and said drain region, and
wherein said carbon black has an average diameter greater than zero and up to about 0.1 μm.

15. A display device comprising:
a first substrate:
a second substrate opposed to said first substrate;
a thin film transistor provided over said first substrate and comprising a source region, a drain region, a channel forming region provided between said source region and said drain region, at least said channel forming region comprising an amorphous semiconductor comprising silicon;
a resin black matrix provided over said second substrate and comprising a resin and a carbon black; and
a planation film provided over said second substrate,
wherein said thin film transistor further comprises a low-concentration impurity region provided between said channel forming region and at least one of said source region and said drain region, and
wherein said carbon black has an average diameter greater than zero and up to about 0.1 μm.

16. The device of claim 14 further comprising a liquid crystal provided between said first substrate and said second substrate, said liquid crystal being selected from the group consisting of a nematic liquid crystal, a cholesteric liquid crystal, a smectic liquid crystal, and a dispersive liquid crystal in which one of said nematic liquid crystal, said cholesteric liquid crystal and said smectic liquid crystal is dispersed in a transparent resin material.

17. The device of claim 16 wherein said resin comprises an acrylic resin.

18. The device of claim 15 further comprising a liquid crystal provided between said first substrate and said second substrate, said liquid crystal being selected from the group consisting of a nematic liquid crystal, a cholesteric liquid crystal, a smectic liquid crystal, and a dispersive liquid crystal in which one of said nematic liquid crystal, said cholesteric liquid crystal and said smectic liquid crystal is dispersed in a transparent resin material.

19. The device of claim 18 wherein said resin comprises an acrylic resin.

20. The device of claim 15 wherein said resin comprises an acrylic resin.

* * * * *